US009262023B2

(12) United States Patent
Guard et al.

(10) Patent No.: US 9,262,023 B2
(45) Date of Patent: Feb. 16, 2016

(54) DRIVE SIGNALS FOR A TOUCH SENSOR

(75) Inventors: David Brent Guard, Southampton (GB); Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 270 days.

(21) Appl. No.: 13/544,680

(22) Filed: Jul. 9, 2012

(65) Prior Publication Data
US 2014/0009406 A1      Jan. 9, 2014

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
CPC ... G06F 1/00; G06F 2003/00; G06F 2101/00; G06F 2200/00
USPC ............................ 345/173, 174; 341/143, 139
See application file for complete search history.

(56) References Cited

U.S. PATENT DOCUMENTS

| 5,359,156 A * | 10/1994 | Chan et al. ............. 178/20.02 |
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,261,619 B2 * | 9/2012 | Shin et al. ......................... 73/753 |
| 2008/0158175 A1 * | 7/2008 | Hotelling et al. ............. 345/173 |
| 2008/0204422 A1 * | 8/2008 | Moon et al. .................... 345/173 |
| 2008/0295603 A1 * | 12/2008 | Shin et al. ....................... 73/753 |
| 2009/0315854 A1 | 12/2009 | Matsuo |
| 2010/0059295 A1 * | 3/2010 | Hotelling et al. .......... 178/18.06 |
| 2011/0063154 A1 * | 3/2011 | Hotelling et al. ............. 341/143 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0313675 A1 * | 12/2012 | Oh ................................. 327/142 |
| 2013/0076612 A1 | 3/2013 | Myers |

FOREIGN PATENT DOCUMENTS

JP          08-327392        * 12/1996  ............... G01D 5/24
WO    WO 2012/129247        9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Olga Merkoulova
(74) *Attorney, Agent, or Firm* — Baker Botts L.L.P.

(57) ABSTRACT

In one embodiment, a method includes generating a drive signal configured to drive a plurality of drive electrodes of a touch sensor. The method also includes modifying the drive signal such that each drive electrode is driven by a drive signal having a unique first characteristic. The method further includes receiving a plurality of sense signals from a plurality of sense electrodes of the touch sensor. The method additionally includes determining a location of a touch input relative to the touch sensor based on at least the first characteristic of the plurality of sense signals.

15 Claims, 2 Drawing Sheets

DRIVE SIGNALS FOR A TOUCH SENSOR

TECHNICAL FIELD

This disclosure generally relates to the drive signals for a touch sensor.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or be provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
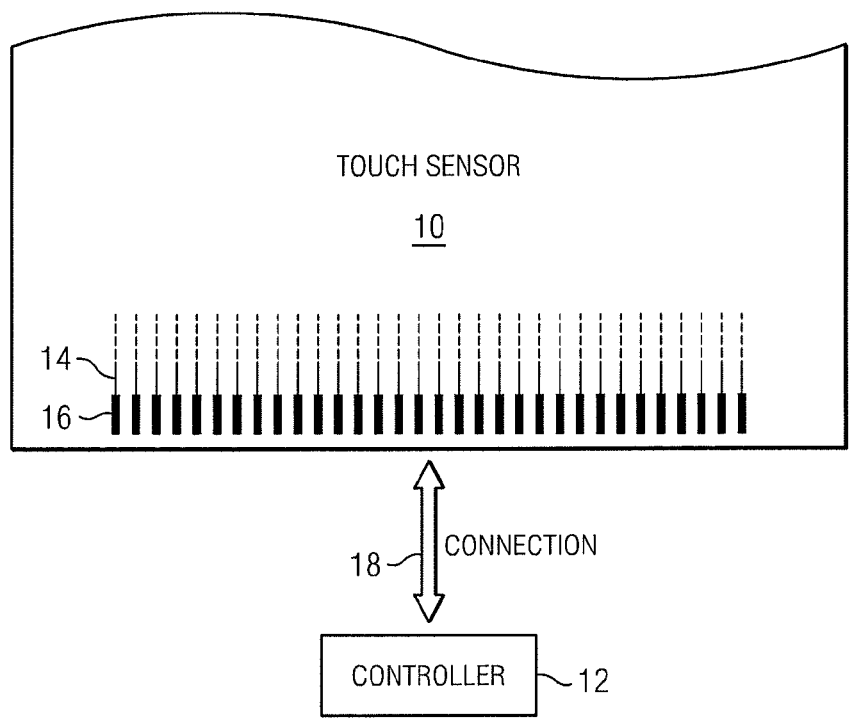
FIG. 1 illustrates an example touch sensor with an example controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. In some embodiments, one or more layers of a display stack (e.g., an OLED display stack, an LCD display stack, etc.) may function as a substrate for touch sensor 10. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by one or more drive circuits of touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
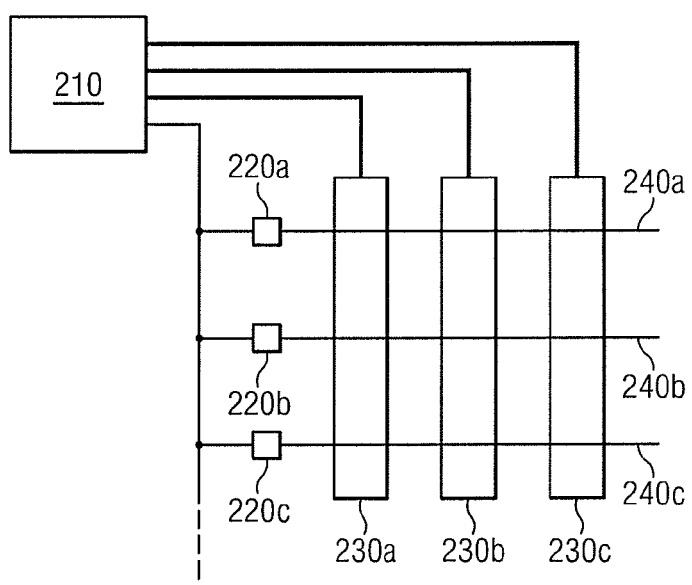
FIG. 2 illustrates an example block diagram of a touch sensor in which a drive signal is modified by a plurality of delay circuits.
Figure 3:
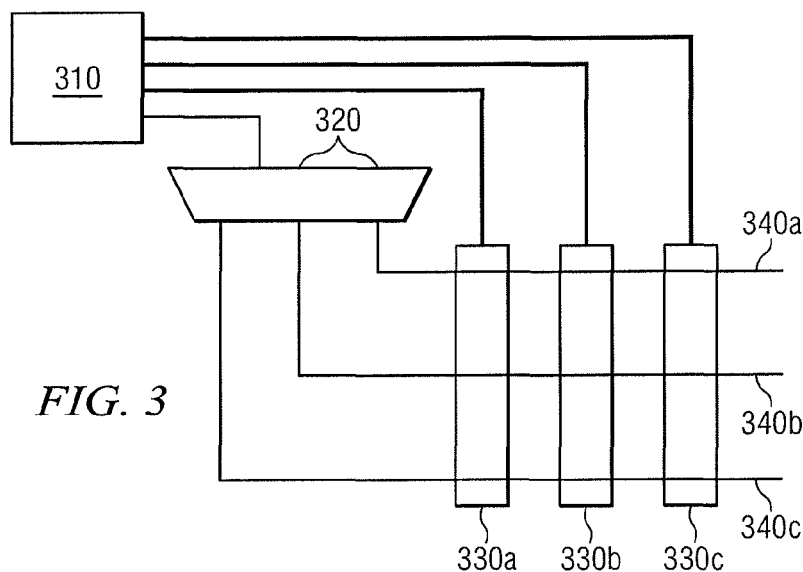
FIG. 3 illustrates an example block diagram of a touch sensor in which a drive signal is modified by a demultiplexer.
Figure 4:
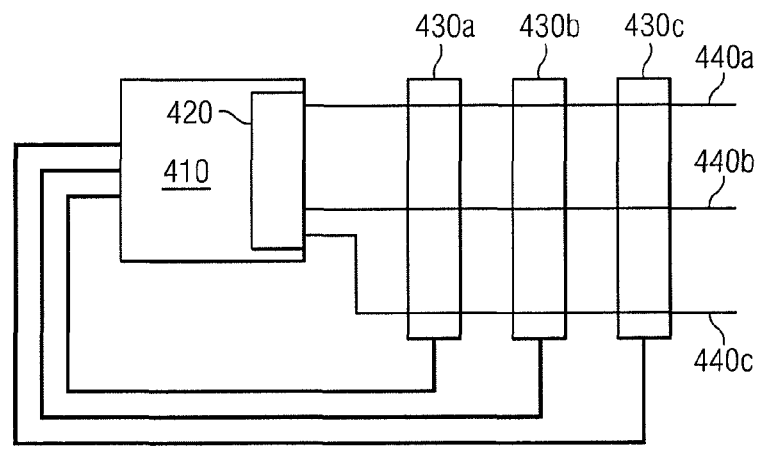
FIG. 4 illustrates an example block diagram of a touch sensor in which a drive signal is modified by an internal circuit.

FIGS. 2 through 4 illustrate various embodiments in which the control signal is modified in order to provide a drive signal to a plurality of different drive electrodes. Although the depicted embodiments in FIGS. 2 through 4 include three drive electrodes and three sense electrodes, other embodiments may include touch sensors with additional drive electrodes and/or sense electrodes. Furthermore, while only a single drive signal or drive circuit may be described with respect to FIGS. 2 through 4, it is contemplated that certain embodiments may comprise more than one drive signal or drive circuit. Regardless of the number of drive circuits, each drive circuit will generate a drive signal that is modified to drive more than one drive electrode (e.g., the number of drive signals or drive circuits will be less than the number of drive electrodes).

In FIGS. 2 through 4, the touch controller includes a single drive circuit that provides a single drive signal that is modified to uniquely drive each of the three drive electrodes. The touch controller also monitors the sense signals from the sense electrodes. As discussed above with respect to FIG. 1, the sense signals will communicate any change in capacitance or charge at a node (e.g., the intersection of a drive electrode and a sense electrode) to the touch controller. The touch controller may then determine the location of a touch input based on which sense electrode experienced the change in charge or capacitance and one or more characteristics of the sense signal. The characteristic of the sense signal will vary between the drive electrodes based on how the drive signal was modified. In certain embodiments, the touch sensor controller, and its corresponding drive circuit, may be configured to provide a single drive signal (or set of drive signals) per sense cycle. A sense cycle may include the time necessary for the controller to generate a drive signal and receive a sense signal from each of the sense electrodes.

In FIG. 2, controller 210 comprises a drive circuit configured to generate a single drive signal that is time delayed by delay circuits 220a, 220b, and 220c. Each delay circuit 220 may delay the drive signal by a different amount of time. This may, in effect, cause each drive electrode 240 to receive the drive signal at a different time. Touch controller 210 may then use the variations in time to determine which drive electrode 240 is associated with each of the received sense signals. This may allow controller 210 to determine the node (e.g., which drive electrode/sense electrode intersection) associated with the touch input.

In the depicted embodiment, a single drive signal is provided and each drive electrode 240 has its own corresponding delay circuit 220. Each delay circuit 220 may provide a different delay time. This may allow each drive electrode 240 to receive the drive signal at a different time. In some embodiments, controller 210 may include additional drive circuits. Each of these drive circuits may generate a different drive signal that is delayed by differing amounts of time for different drive electrodes 240. For example, if a touch sensor is designed with 100 drive electrodes, controller 210 may generate 4 unique drive signals, each of these unique drive signals may be coupled to a different set of 25 different delay circuits associated with a different set of 25 drive electrodes. Thus, the 4 unique drive signals, in combination with the 100 delay circuits (4 different sets of 25 different delay circuits) may provide 100 different drive signals. In some embodiments, each set of 25 delay circuits may comprise a similar set of delay amounts. For example, the 100 electrodes may receive 4 unique drive signals at 25 different times. The uniqueness of the 4 unique drive signals may vary depending on the embodiment, for example the 4 unique drive signals may include different frequencies, different time slots, different wavelengths, different amplitudes, different patterns (e.g., pulse patterns), different lengths, different start or transmission times, or any other variation which may allow touch controller 210 to distinguish between received sense signals. Although the embodiments above included specific numbers of drive signals and drive electrodes, other embodiments may include any appropriate number of drive signals and drive electrodes such that the number of drive signals (before modification) is less than the number of drive electrodes. Furthermore, other embodiments may include any appropriate number of sense electrodes 230 (the number of sense electrodes does not have to equal the number of drive electrodes).

In FIG. 3, the drive signal from controller 310 is manipulated by demultiplexer 320. Depending on the embodiment, demultiplexer 320 may be configured to provide frequency division demultiplexing, or time division demultiplexing. With respect to time division demultiplexing, controller 310 may provide a single, relatively long, drive signal. Demultiplexer 320 may then divide the drive signal into individual time slots, each drive electrode 340 would receive a drive signal in a different time slot. When touch controller 310 receives the sense signals from sense electrodes 330, touch controller 310 may be able to identify a corresponding drive electrode 340 based on the respective timeslots of the sense signals. With respect to frequency division demultplexing, controller 310 may provide a single drive signal that comprises several different frequencies. Demultiplexer 320 may then divide the drive signal into different sub-frequencies, each drive electrode 340 would receive a drive signal with a different sub-frequency. When touch controller 310 receives the sense signals from sense electrodes 330, touch controller 310 may be able to identify a corresponding drive electrode 340 based on the respective sub-frequencies of the sense signals.

Although only a single demultiplexer 320 is depicted, other embodiments may include multiple demultiplexers. For example, in some embodiments, multiple demultiplexers may be configured such that each demultiplexer divides the drive signal into different sub-frequency or time-slot ranges. The corresponding ranges may overlap or be unique. For example, if the drive signal comprise a frequency range of 100 to 200 Hz, one demultiplexer may divide the drive signal into a first drive signal comprising a frequency range of 100 to 140 HZ and a second drive signal comprising a frequency range of 140 to 180 HZ; a second demultiplexer may divide the drive signal into a first drive signal comprising a frequency range of 120 to 160 HZ and a second drive signal comprising a frequency range of 160 to 200 HZ. Although a particular frequency range has been provided, other embodiments may comprise any suitable frequency range and any suitable sub-frequency ranges.

In some embodiments, multiple demultiplexers may be arranged such that each demultiplexer may receive its own unique drive signal from controller 310. The unique drive signals may include different frequencies, different time slots, different wavelengths, different amplitudes, different patterns (e.g., pulse patterns), different lengths, different start or transmission times, or any other variation which may allow touch controller 310 to distinguish between received sense signals.

In some embodiments, multiple demultiplexers may be arranged in a cascaded arrangement. For example, touch controller 310 may generate a relatively long drive signal that comprises a range of frequencies. One or more time division demultiplexers may divide the relatively long drive signal into different time slots. Then, one or more frequency division demultiplexers may divide the different time-slotted drive signals into different sub-frequencies. Touch controller 310 may then use the time slot and sub-frequency range of a received sense signal to determine the corresponding drive electrode 340.

Although the above examples discussed with respect to FIG. 3 included specific numbers of drive signals, drive electrodes, and demultiplexers and particular arrangements of components other embodiments may include any appropriate number of drive signals and drive electrodes such that the number of drive signals (before modification) is less than the number of drive electrodes and any appropriate arrangement of components.

In FIG. 4, modifying circuitry 420 is integrated in with controller 410. For example, if delay circuits, such as delay circuits 220 from FIG. 2, are to be used to modify a drive signal, then the delay circuits may be a part of touch controller 410 (along with the drive circuit that generates the drive signal). As another example, if one or more demultiplexer circuits, such as demultiplexer circuit 320 from FIG. 3, are to be used to modify a drive signal, then the demultiplexer circuits may be a part of touch controller 410 (along with the drive circuit that generates the drive signal). In some embodiments, a combination of delay circuits and demultiplexers may be used as modifying circuitry 420 within touch controller 410.

Integrating modifying circuitry 420 into touch controller 410 may simplify the manufacturing of the sensor substrate comprising drive electrodes 440 and sense electrodes 430 (as compared to having the modifying circuitry be external to touch controller 410) and may simply the manufacturing of touch controller 410 (as compared to a traditional touch controller in which there is a separate drive circuit for each drive electrode). Manufacturing the modifying circuitry on the same substrate as the drive electrodes may reduce simply the manufacturing of touch controller 410 (as compared to a traditional touch controller in which there is a separate drive circuit for each drive electrode) and may reduce the number of connection pads needed since one drive signal is driving multiple drive electrodes.

In some embodiments, one or more features from any of the above figures may be combined with any other features from any of the above figures. For example, some embodiments may comprise a demultiplexer circuit configured to divide (e.g., via time division or frequency division) a single drive signal into multiple drive signals. Each of these drive signals may then be delayed for differing amounts of time by delay circuits. As another example, the drive signal may first be delayed by several delay circuits, the output of the delay circuits may then be demultiplexed prior to driving the drive electrodes. As another example, in some embodiments in which a combination of delay circuits and demultiplexer circuits are used, one or the other may be integrated in the touch controller and the other may be formed on the sensor substrate.

Figure 5:
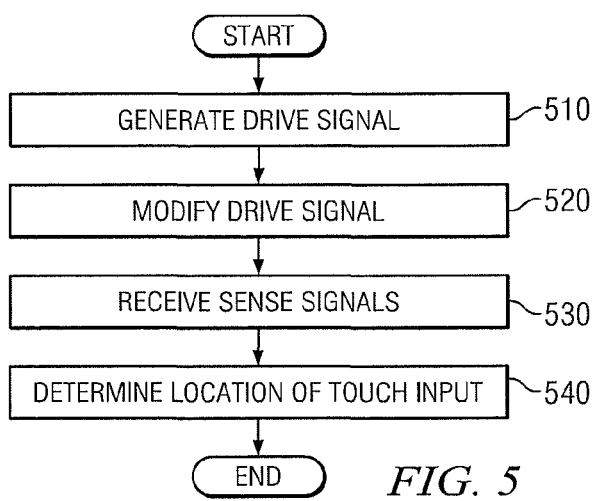
FIG. 5 illustrates steps in an example method for modifying a drive signal.

FIG. 5 depicts a method for determining a location of a touch input using a reduced number of drive signals. The reduced number of drive signals refers to there being fewer drive circuits (generating an unmodified drive signal) than there are drive electrodes on a touch sensor. The method begins at step 510 where a drive signal is generated. The drive signal may be generated by a drive circuit. The number of drive signals generated at step 510 may vary depending on the embodiment, but will be less than the number of drive electrodes. By reducing the number of drive circuits needed to generate the drive signals, the touch controller may comprise a simpler design. This may reduce the manufacturing complexity and/or expense as compared to a traditional touch controller in which a separate drive circuit is created for each drive electrode. In some embodiments, only one drive signal may be generated per sense cycle. In particular embodiments, a single set of drive signals may be generated once per sense cycle. In embodiments in which a set of drive signals is produced, each drive signal within the set may be unique in some manner (e.g., time, length, frequency, etc.).

At step 520 the drive signal is modified. In certain embodiments, the drive signal may be modified such that each drive electrode is driven by a drive signal having a unique characteristic (e.g., a unique time-slot, frequency, timing characteristic, etc.). The drive signal may be modified by circuitry that is located on the controller or functionally between the controller and the corresponding drive electrodes. The drive signal may be modified in any of a variety of different ways. For example, in some embodiments the drive signal may be delayed for several different delay periods. Each delay period may be associated with a different drive electrode. The drive electrodes may thus receive the drive signal at different times. As another example, in some embodiments, the drive signal may be demultiplexed into different timeslots. In such an embodiment, the drive signal generated at step 510 may be relatively long. A time division demultiplexer may then divide the drive signal into time slots which are then provided to the drive electrodes. This may provide the drive electrodes with drive signals in different time slots. As another example, in some embodiments, the drive signal may be demultiplexed into different frequencies. In such an embodiment, the drive signal generated at step 510 may comprise all the required frequencies. A frequency division demultiplexer may then divide these frequencies into individual sub-frequencies, or channels, which are then sent to the corresponding drive electrodes. This may provide each drive electrode with a drive signal having a different range of sub-frequencies. As another example, a combination of time and frequency modification may be performed on the drive signal. The modifications made to the drive signal may allow a touch controller to correlate a particular sense signal with its corresponding drive electrode.

At step 530 sense signals are received. The sense signals may be received from a plurality of different sense electrodes. The received sense signals may reflect the varying modifications provided to the drive signal at step 520. The received sense signals may also reflect any change in capacitance, charge or other electrical property of the sense electrode that may indicate a touch input.

At step 540 the location of a touch input is determined. The location, within a touch sensor, may be determined from a combination of different characteristics from different signals. For example, the location of a touch input may be based on which one or more of the sense electrodes provided an indication of a touch input. The controller may also use one or more characteristics of the sense signal to determine which of the corresponding drive electrodes is associated with the sense signal. For example, if a frequency division demultiplexer is used to generate the drive signals from a single drive signal, then the controller may look at the frequency of the sense signal to determine which drive electrode is associated with the corresponding sense signal.

The steps depicted in FIG. 5 represent a single sense cycle. Steps 510 through 540 may be performed several times per second in order to provide a functioning touch sensor. Each time the steps of FIG. 5 are repeated, the location of the touch input may be updated.

Although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5 this disclosure contemplates any suitable combination of any suitable components, devices, or systems carrying out any suitable steps of the method of FIG. 5

Herein, reference to a computer-readable non-transitory storage medium may include a semiconductor-based or other integrated circuit (IC), such as for example a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a touch sensor comprising a plurality of electrodes;
    a controller electrically coupled to the plurality of electrodes, the controller comprising a drive circuit configured to provide a subset of the plurality of electrodes with a drive signal; and
    one or more delay circuits coupled between the subset of the plurality of electrodes and the controller, the one or more delay circuits being configured to delay the drive signal by a different length of time for each electrode of the subset of electrodes.

2. The apparatus of claim 1, wherein the controller comprises one drive circuit.

3. The apparatus of claim 1, wherein each electrode of the subset of the plurality of electrodes is coupled to a different delay circuit of the one or more delay circuits.

4. The apparatus of claim 1, wherein the one or more delay circuits are within the controller.

5. The apparatus of claim 1, wherein the drive circuit is configured to provide one drive signal per sense cycle.

6. A method comprising:
   providing, by a drive circuit of a controller electrically coupled to a plurality of electrodes of a touch sensor, a drive signal to a subset of the plurality of electrodes; and
   delaying, by one or more delay circuits coupled between the subset of the plurality of electrodes and the controller, the drive signal by a different length of time for each electrode of the subset of electrodes.

7. The method of claim 6, wherein the controller comprises one drive circuit.

8. The method of claim 6, wherein each electrode of the subset of the plurality of electrodes is coupled to a different delay circuit of the one or more delay circuits.

9. The method of claim 6, wherein the one or more delay circuits are within the controller.

10. The method of claim 6, wherein the drive circuit is configured to provide one drive signal per sense cycle.

11. A non-transitory computer-readable medium embodying logic that is configured, when executed, to perform operations comprising:
    providing, by a drive circuit of a controller electrically coupled to a plurality of electrodes of a touch sensor, a drive signal to a subset of the plurality of electrodes; and
    delaying, by one or more delay circuits coupled between the subset of the plurality of electrodes and the controller, the drive signal by a different length of time for each electrode of the subset of electrodes.

12. The non-transitory computer-readable medium of claim 11, wherein the controller comprises one drive circuit.

13. The non-transitory computer-readable medium of claim 11, wherein each electrode of the subset of the plurality of electrodes is coupled to a different delay circuit of the one or more delay circuits.

14. The non-transitory computer-readable medium of claim 11, wherein the one or more delay circuits are within the controller.

15. The non-transitory computer-readable medium of claim 11, wherein the drive circuit is configured to provide one drive signal per sense cycle.

* * * * *